United States Patent [19]

Abbott et al.

[11] Patent Number: 4,589,080

[45] Date of Patent: May 13, 1986

[54] APPARATUS AND METHOD FOR PREDICTING FAILURE IN A COPIER'S PAPER PATH

[75] Inventors: Jerry J. Abbott; James E. Bierschbach; Keith N. Bobo, all of Longmont; Greg S. Herring, Boulder, all of Colo.

[73] Assignee: International Business Machines Corporation, Armonk, N.Y.

[21] Appl. No.: 387,722

[22] Filed: Jun. 11, 1982

[51] Int. Cl.[4] ........................ G06F 15/20; G06G 7/48

[52] U.S. Cl. .................................. 364/552; 355/14 R

[58] Field of Search ................................ 364/550-552, 364/554, 523; 371/20; 355/14 R; 377/8

[56] References Cited

U.S. PATENT DOCUMENTS

| | | | |
|---|---|---|---|
| 3,433,935 | 3/1969 | Sherman | 235/183 |
| 3,471,685 | 10/1969 | Bishop, III | 235/151.13 |
| 3,492,570 | 1/1970 | Tanzman | 324/70 |
| 3,610,899 | 10/1971 | Dahlin | 364/554 |
| 3,612,839 | 10/1971 | DeWitt et al. | 364/554 |
| 3,787,670 | 1/1974 | Nelson et al. | 235/153 |
| 3,893,175 | 7/1975 | Solomon | 360/6 |
| 4,009,371 | 2/1977 | Hamilton et al. | 235/92 |
| 4,062,061 | 12/1977 | Batchelor et al. | 371/20 |
| 4,084,900 | 4/1978 | Yamaoka et al. | 355/14 |
| 4,122,996 | 10/1978 | Wilezek | 371/20 |
| 4,142,238 | 2/1979 | Brandt | 364/552 |
| 4,155,116 | 5/1979 | Tawfick et al. | 371/20 |
| 4,156,133 | 5/1979 | Legg | 235/92 |
| 4,161,277 | 7/1979 | Steiner | 371/29 |
| 4,168,525 | 9/1979 | Russell | 364/559 |
| 4,206,996 | 6/1980 | Clark et al. | 355/14 R |
| 4,227,798 | 10/1980 | Steiner | 371/20 |
| 4,310,237 | 1/1982 | Gengelbach | 355/14 |
| 4,339,657 | 7/1982 | Larson et al. | 235/92 |
| 4,343,036 | 8/1982 | Shimizu et al. | 371/20 |
| 4,381,447 | 4/1983 | Hoovath et al. | 364/552 |

FOREIGN PATENT DOCUMENTS

| | | | |
|---|---|---|---|
| 1449777 | 9/1976 | United Kingdom | 364/900 |

OTHER PUBLICATIONS

IBM Technical Disclosure Bulletin entitled "Method and Testing Optical Tachometers" by R. F. Farnsworth et al., Mar. 1980, vol. 22, No. 10, pp. 4384–4385.

IBM Technical Disclosure Bulletin entitled "Collator Return Timing Using Back EMF Sensing" by W. C. Dodt et al., Mar. 1980, vol. 22, No. 10, p. 4392.

*Primary Examiner*—James D. Thomas

*Assistant Examiner*—Dale M. Shaw

*Attorney, Agent, or Firm*—Gunter A. Hauptman; Earl C. Hancock

[57] ABSTRACT

Selected points in a copier are monitored by signal lines connected to a computer. If a signal is detected on a signal line, the time of occurrence is stored in the computer's memory at a location associated with the point that caused the signal. Eventually an array of the times of operation of each monitored point will be stored. The computer then calculates the difference between the times stored for selected pairs of the monitored points and stores these, as intervals, in additional locations of the memory. The intervals are combined to give calculated statistical results (mean, deviation, etc.) each of which is then compared against predetermined values normal for correctly operating copiers also stored in the memory. The results of the comparison set error flags if the limits are exceeded indicating possible future copier failures.

3 Claims, 11 Drawing Figures

APPARATUS AND METHOD FOR PREDICTING FAILURE IN A COPIER'S PAPER PATH

BACKGROUND OF THE INVENTION

1. Field Of The Invention

The invention relates to electrophotographic image copying machines and more particularly to predicting failure in the paper handling path thereof.

2. Description Of The Prior Art

Copiers electrophotographically reproduce on paper, images originally represented on paper documents, magnetic media, etc. The more complicated the copier, the more chance for failure during operation. When a high volume, communication-oriented copier fails, it is difficult to retrieve lost information. Therefore, prediction of when a copier is likely to fail is important to the orderly conduct of business.

Ideally, copiers signal when and why they will fail in time for operators to methodically end current jobs and call service personnel. In IBM TECHNICAL DISCLOSURE BULLETIN entitled "Method for Testing Optical Tachometers," by R. F. Farnsworth et al, March 1980, pages 4383–4385, degradation in a servo-system beyond prespecified acceptable criteria gives an "early warning" of failure. Patent application Ser. No. 118,953, entitled "Improved Error Logging for Automatic Apparatus" by S. T. Riddle et al, filed Feb. 6, 1980, now U.S. Pat. No. 4,339,657, and assigned to IBM Corporation, Armonk, N.Y., compares errors with a criterion and logs the results. U.K. Pat. No. 1,449,777 statistically analyzes accumulated error counts in a data system. U.S. Pat. No. 3,471,685 discloses statistical analysis of a moving sheet's properties. U.S. Pat. No. 4,310,237 adjusts a copier's exposure, compensate for variations from a design standard, in accordance with a stored array. However, the prior art does not disclose apparatus for predicting that a copier will fail, before it actually fails, by statistical analysis of signals at selected points within the copier.

SUMMARY OF THE INVENTION

A computer connects to selected points in a copier supplying signals indicating its operating status. The intervals between selected signals are calculated repeatedly and an average value, mean value, deviation, variation, etc., for each interval is stored. Values characterizing the distribution of intervals are compared with predetermined normal distributions stored in the computer. When the stored value exceeds the normal distribution for that value, the computer identifies the associated value and the copier operations that will be affected.

DESCRIPTION OF THE PREFERRED EMBODIMENT

Figure 1:
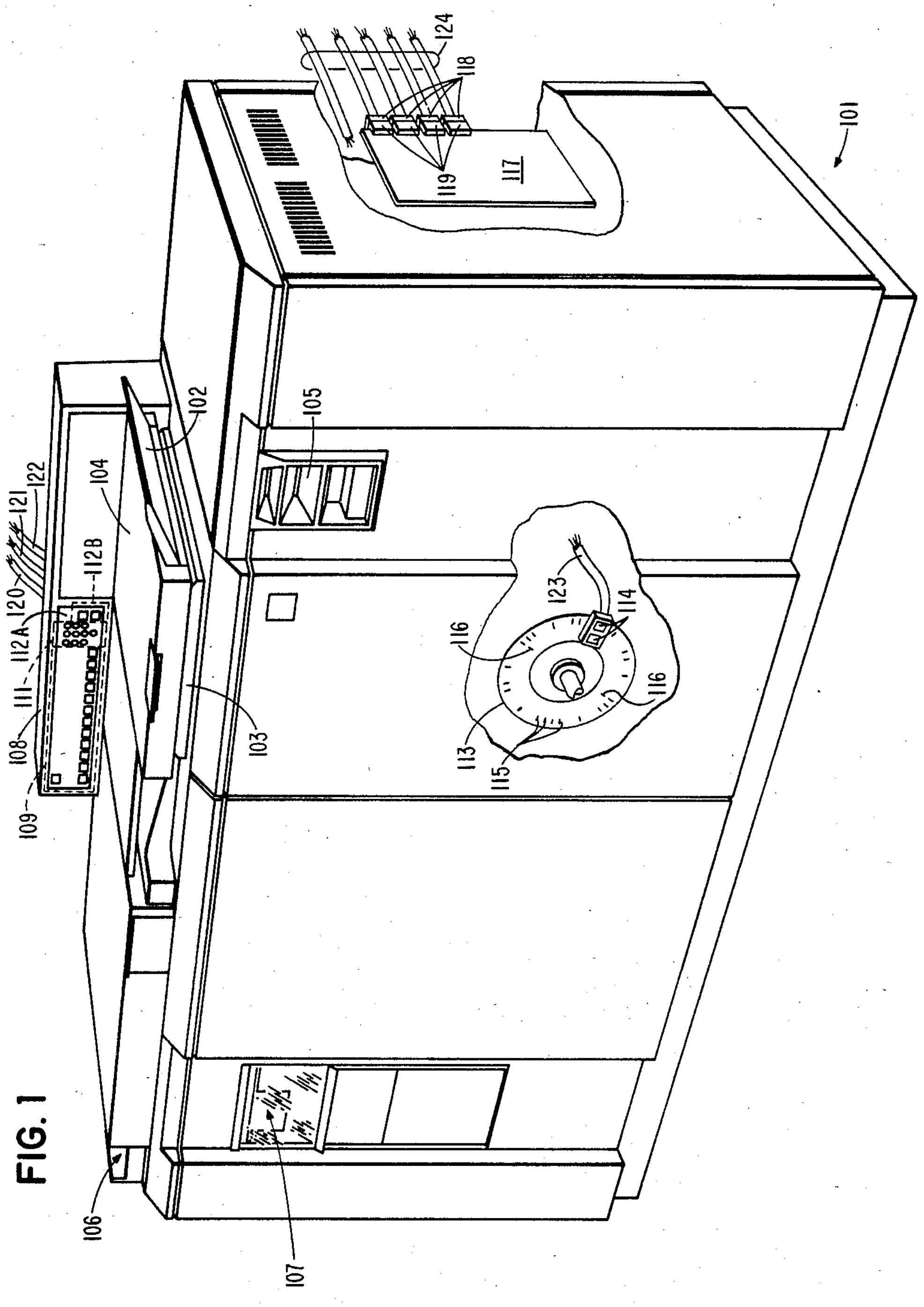
FIG. 1 shows a copier incorporating the invention.

Referring to FIG. 1, an information distributor 101, entry tray 102, receives original document sheets for copying. The IBM 6670 Information Distributor marketed by the International Business Machines Corporation, which illustrates such a device, is described in the IBM 6670 INFORMATION DISTRIBUTOR SERVICE MANUAL, January 1979, Form No. 241-6131-0, available from the International Business Machines Corporation. Documents placed in the entry tray 102 move over a document glass 103 covered by a document cover 104. Alternatively, instead of entering original documents, magnetic cards, carrying indicia representing information to be produced by the information distributor 101, may be placed into a magnetic card deck 105. When copies are made, either from the originals in the entry tray 102 or magnetic cards in the magnetic card deck 105, copies emerge from a copying mechanism (not shown) in the information distributor 101 at either one of two places: a copy exit pocket 106 or a print exit pocket 107. Normally, when original documents are entered into the entry tray, the copies made therefrom are stacked in the copy exit pocket 106. When magnetic cards are entered into the magnetic card deck 105, information on the cards controls electronic collation of copies, and stacks them by job in the print exit pocket 107.

Figure 2A:
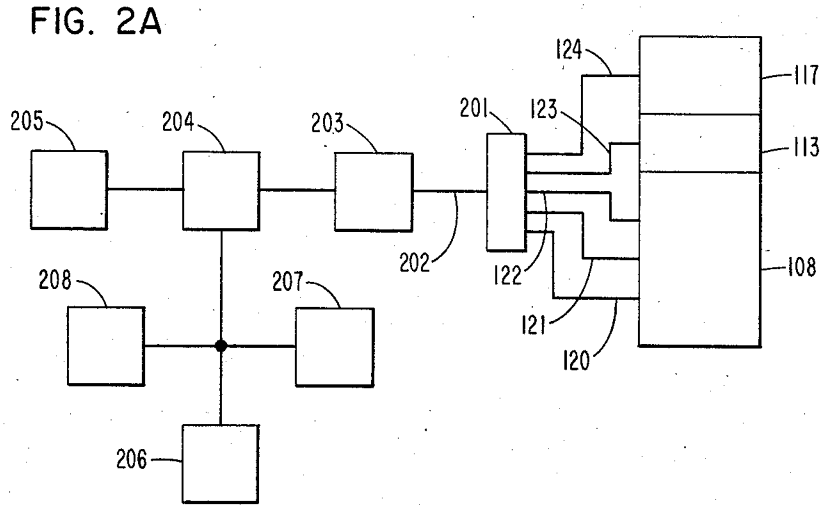
FIGS. 2A and 2B are block diagrams of connections between the copier of FIG. 1 and computer elements.

Still referring to FIG. 1, tower 108 carries lighted push-buttons 109, a lighted control panel display 110, quantity selection buttons 111, and a quantity selection display 112A and start and stop buttons 112B. The lighted push-buttons 109 initiate functions such as "duplex", "collate", "alternate paper", etc. Special messages, including error indications, appear on the control panel display 110. The operator enters the number of copies desired by pressing the quantity selection buttons 111. The quantity selection display 112A shows the number selected and, once copying starts, the number of copies made. The operator pushes the start button to begin copying and the stop button to stop copying and reset the number of copies selected to zero. As shown in FIG. 2A described below, monitor cables 120–122 connect elements 109–112 to external sensors which detect display operation and external actuators which simulate switch operations. Monitor cable 120 connects to lighted push-buttons 109, monitor cable 121 connects to control panel display 110, and monitor cable 122 connects with the quantity selection buttons 111 and quantity selection display 112A and start and stop buttons 112B.

An emitter wheel 113 rotates past sensors 114 to generate "emit" and "sync" pulses which control the copier's timing. For example, if the sensors 114 are pickup circuits, such as magnetic reed switches, each will close a circuit and send a signal into a monitor cable 123 when a corresponding magnetic emit pin 115 or sync pin 116 passes it. A circuit module 117 controls copier functions via connectors 118 attached to terminal pins/sockets 119. The circuit module 117 may combine numerous paper-feed, copy process, external communications, etc., functions. Cables 124 exchange signals with circuit 117 and external actuators and sensors as shown in FIGURE 2A. Referring to FIG. 2A, an interface 201 interconnects monitor cables 120–124 from the circuit module 117, emitter wheel 113 and tower 108 with an input/output bus 202 connected to digital input/output ports 203 of a central processing unit (CPU) 204. An internal random access memory 205, arithmetic hardware 206, and a timer 207 aid the CPU 204 in executing stored programs rapidly. External magnetic disk and diskette drives 208 enlarge the storage capacity. The invention may be practiced using an IBM Series/1

Figure 2B:
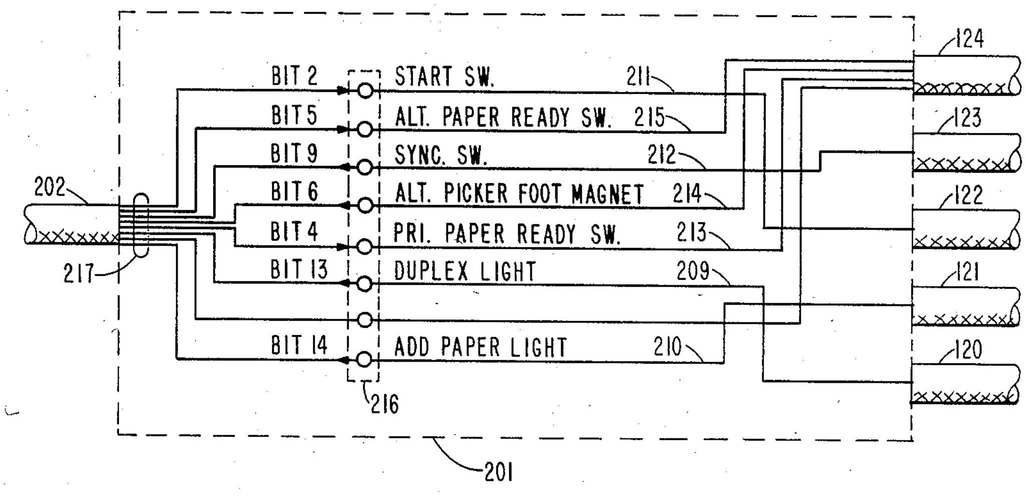

Data Processing System including an IBM 4955 Processor and an IBM 1560 Digital Input/Output Unit. This configuration, when operating under the IBM Event Driven Executive Operating System, controls the copier's switches and senses signals in the copier through the digital input/output ports 203. As shown in FIG. 2B, input/output bus 202 comprises individual bit lines 217 carrying signals representing bits. Although only selected bits are shown, up to 2048 digital input and 2048 digital output bit 217 may connect to the digital input/output ports 203. In addition, other types of signal lines may be connected if desired. Interface terminals 216 electrically couple bit lines 217 to copier signal lines 209–215 from monitor cables 120–124. For example, bit 14 provides an input signal when an Add Paper Light signal occurs on copier signal line 210 and bit 2 provide an output signal on bit line 217, simulates operation of a Start Switch connected to copier signal line 211.

Figure 3:
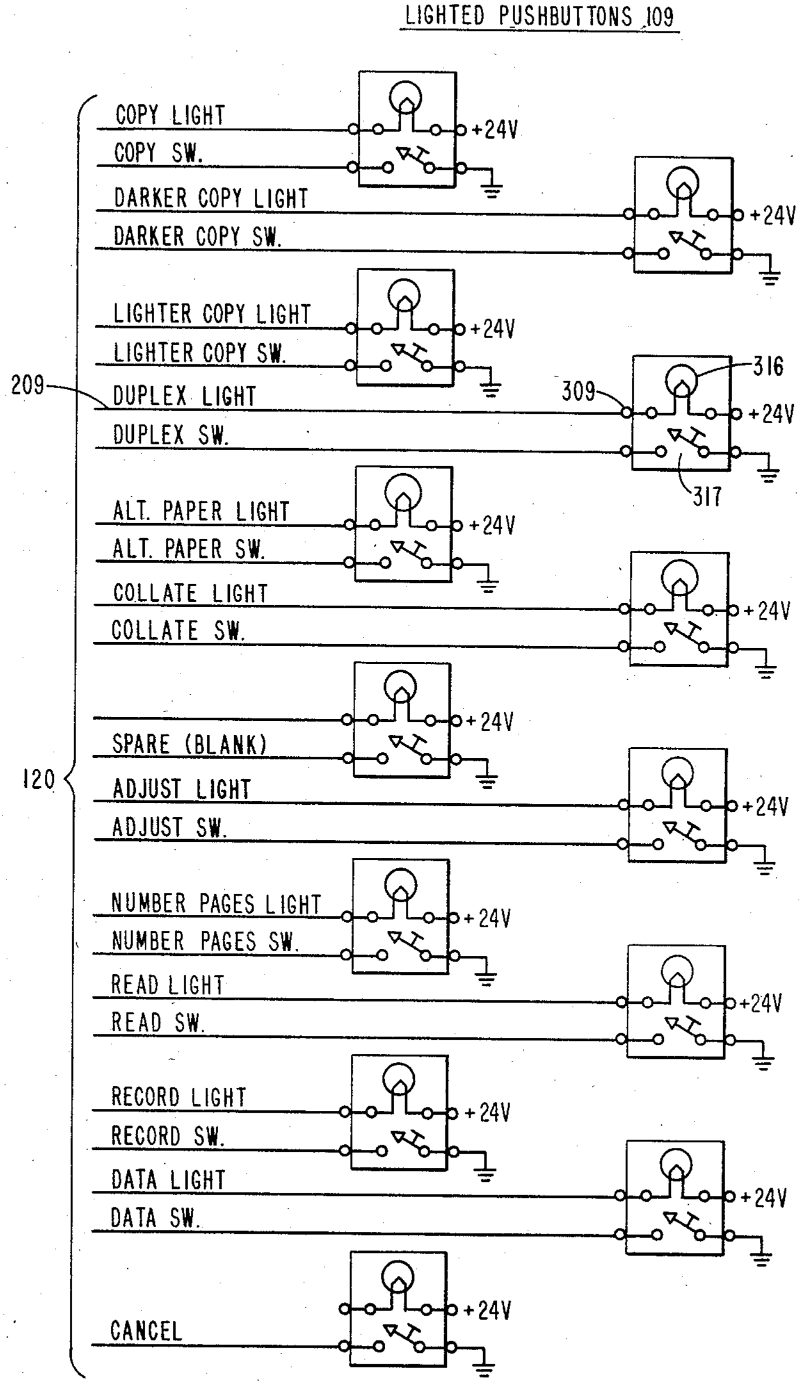
FIGS. 3–5 and 6A–6C are circuit diagrams of sensors and actuators in the copier of FIG. 1.
Figure 4:
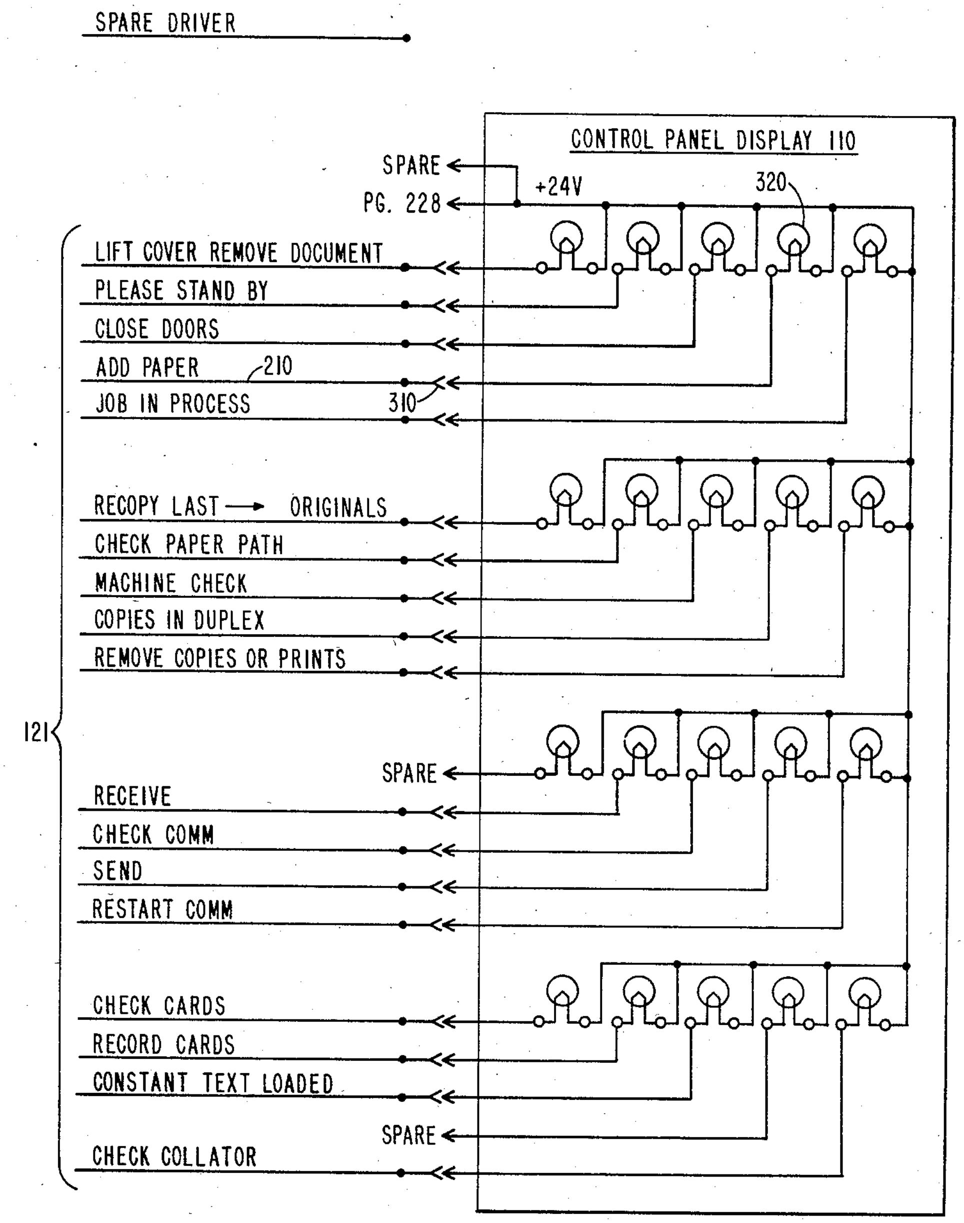
Figure 5:
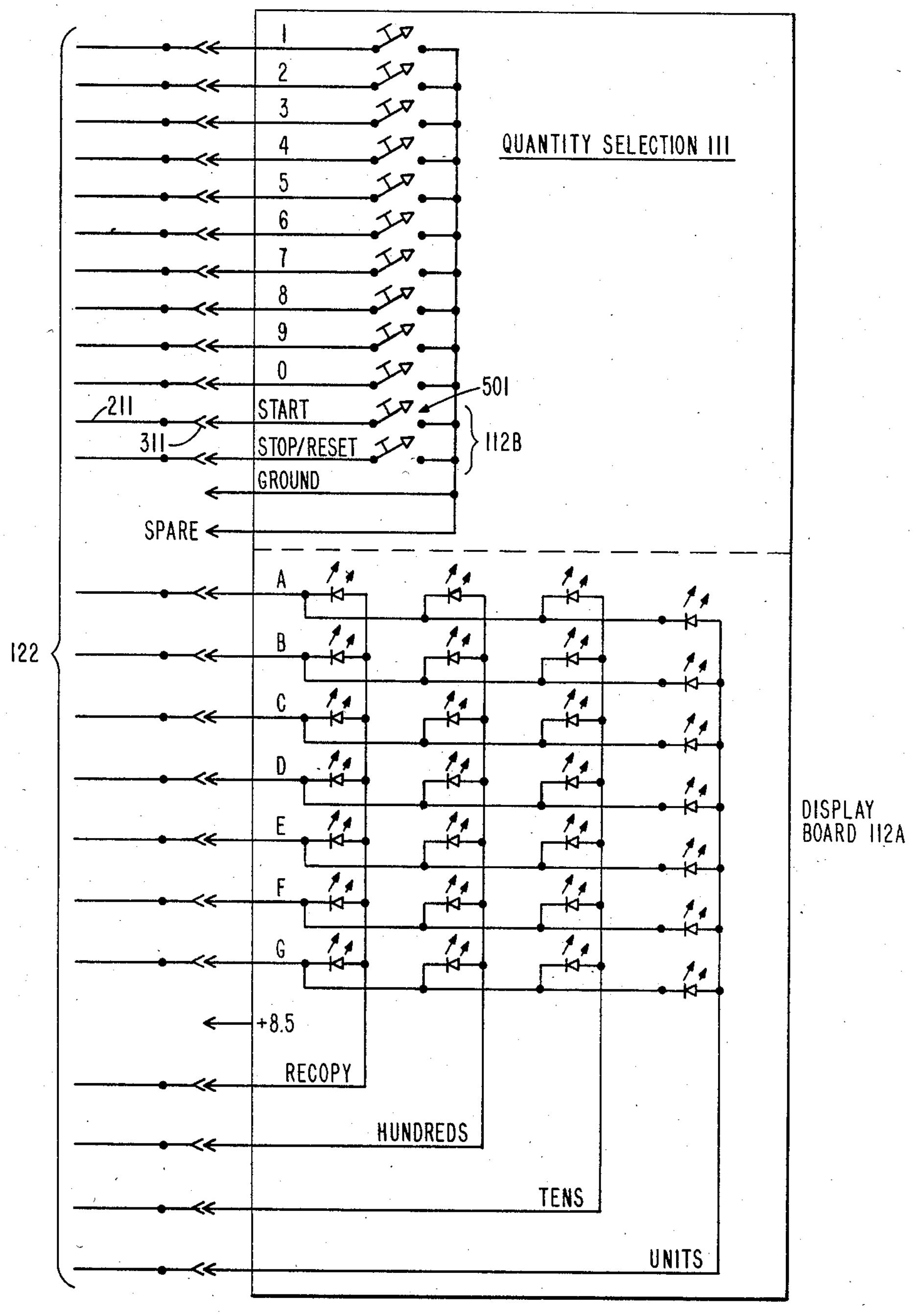
Figure 6A:
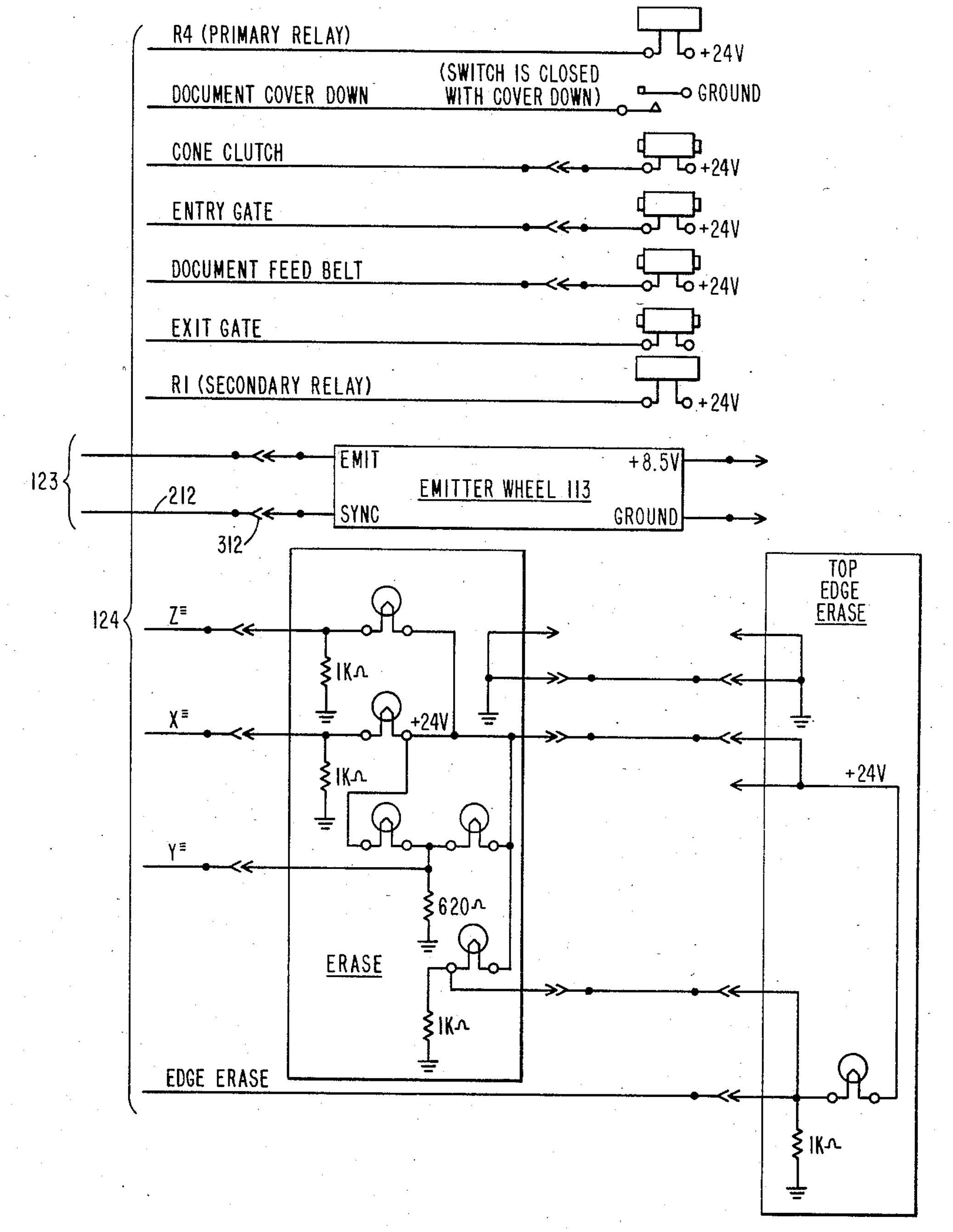
Figure 6B:
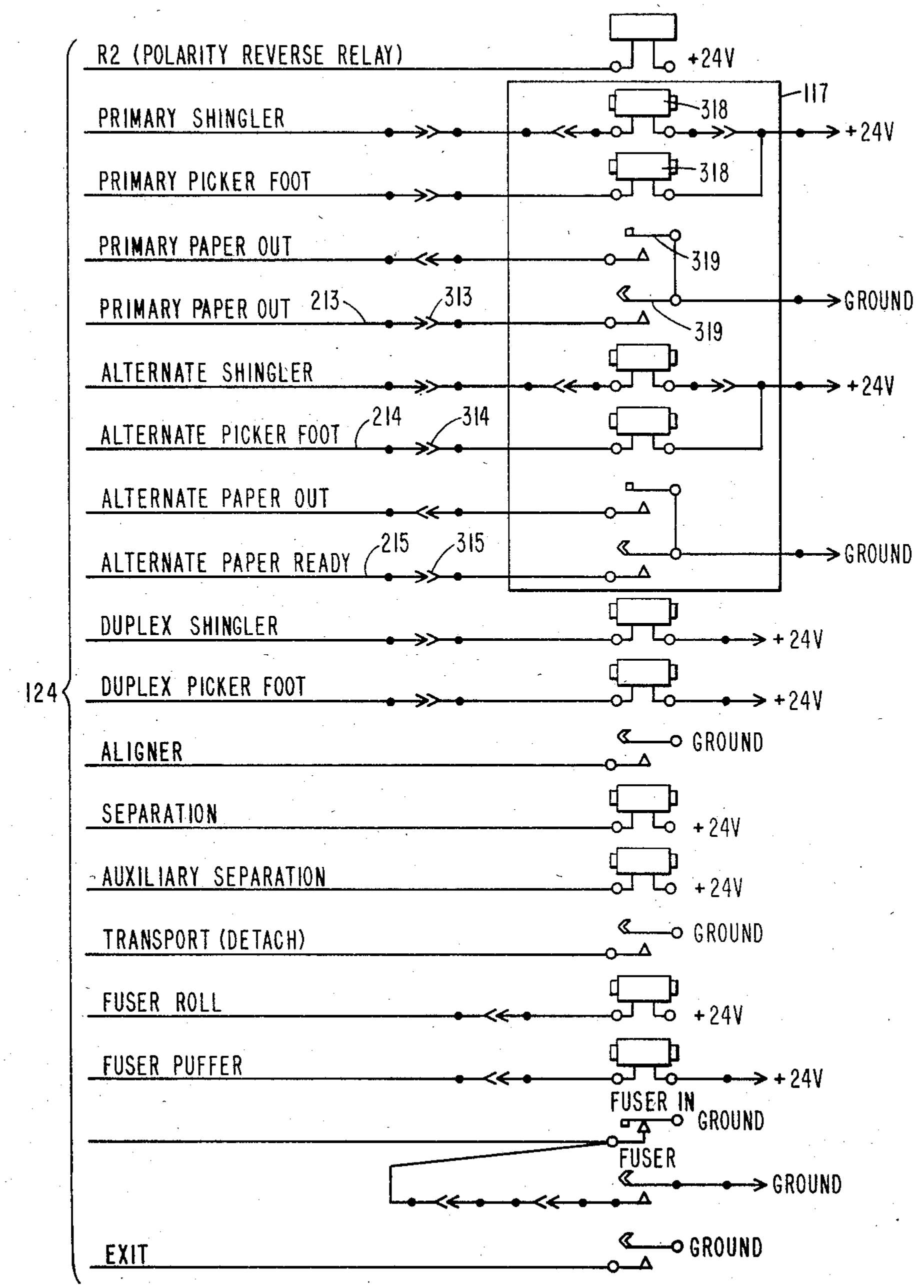
Figure 6C:
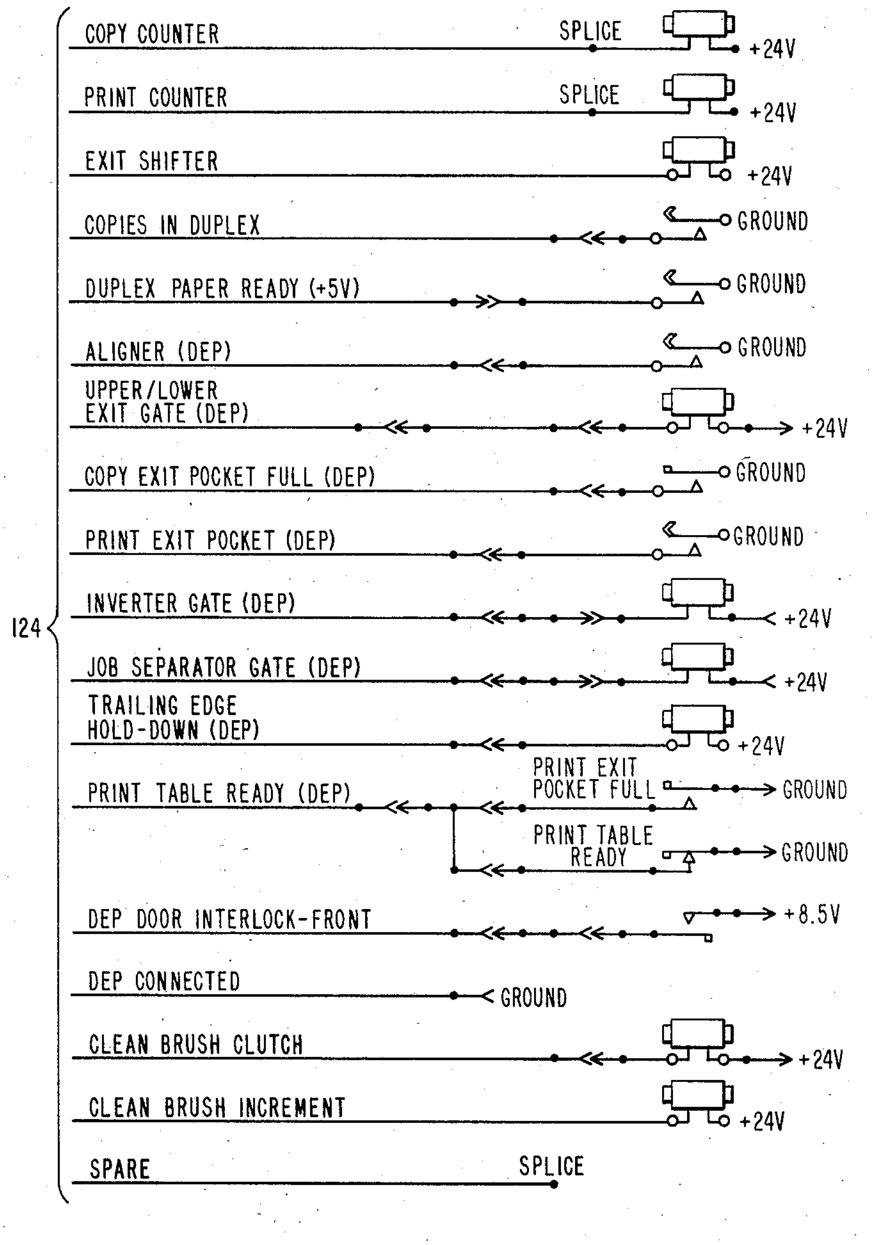

FIGS. 3–6C detail sensors and actuators in the information distributor 101 connected to monitor cables 120–123. In FIG. 3, lighted push-buttons 109, connected to monitor cable 120, each include a Duplex Lamp (for example 316) and a Duplex Switch (for example 317). If the copier is correctly set for duplex operation by initially closing Duplex Switch 317, Duplex Lamp 316 is lit by a ground at copier signal point 309 which is sensed by the CPU 204 in FIG. 2A via copier signal line 209. Similarly, in the control panel display 110, shown in FIG. 4, a ground signal occurs on copier signal line 210 of monitor cable 121 when copier signal point 310 is grounded to light the lamp 320. In FIG. 5, a ground signal on monitor cable 122 copier signal line 211 from the CPU 204 grounds copier signal point 311 simulating closure of start switch 501. The emitter wheel 113 sync signal from one of the sensors 114, appearing at copier signal point 312 of FIG. 6A, is monitored by copier signal line 212 of monitor cable 123. In FIG. 6B, relay magnets 318, controlling relay contacts 319, are mounted on the circuit module 117 and monitored or controlled by appropriate signals on copier signal lines 213–215, of monitor cable 124, attached to copier signal points 313–315.

DESCRIPTION OF THE OPERATION

The interface box 201, FIG. 2B, connects the copier signal lines 209–215 to the CPU 204, FIG. 2A, enabling the CPU 204 to read and store in internal random access memory 205 the times, indicated by timer 207, at which selected copier operations occur. The CPU 204 and related elements operate under the control of an application program, ultimately stored in internal random access memory 205, which directs the monitoring and calculating portions of the invention. The arithmetic hardware 206 repeatedly calculates series of intervals between successive related operations, and then calculates mean values, deviations, variations, etc., for each interval series. Internal random access memory 205 and disk and diskette drives 208 store predetermined mean values, deviations, variations, etc., for each set of related operations, representing the maximum limits thereof derived from the normal distribution of values, etc., for properly operating information distributors 101. The CPU 204 and arithmetic hardware 206 compare the calculated and predetermined mean values, deviations, variations, etc., and indicate as "flags" when the comparison results; that is, bits are set in a pattern representing the results. This pattern is then analyzed to predict information distributor failure. For example, a late operating mechanism, caused by a mechanical defect, may permit copying even though the interval between a signal initiating its operation and a signal indicating its actual operation always exceeds the interval predetermined for the mechanism. At least one bit in the pattern supplied by the CPU 204 will identify this condition which, in the event of further degradation, will eventually cause an information distributor's malfunction. Equations for paper path calculations are:

Sample Mean (Average):

$$\bar{X} = \frac{1}{n} \sum_{j=1}^{n} x_j$$

$\bar{X}$=Average n=17 for Paper Path Testing

Sample Variance:

$$S^2 = \frac{1}{n-1} \sum_{j=1}^{n} (x_j - \bar{x})^2$$

$S^2$=Variance n=17 for Paper Path Testing

Application of these equations to a typical copier gives the following results:

| | Paper Ready | Aligner | Detach | Fuser | Exit |
|---|---|---|---|---|---|
| 24# Avg. | 29.575 | 38.304 | 167.128 | 171.983 | 169.243 |
| 16# Avg. | 29.553 | 38.355 | 166.902 | 172.295 | 168.487 |
| 20# Avg. | 29.604 | 38.646 | 167.033 | 172.245 | 168.494 |
| Min. Avg. | 25.000 | 20.000 | 160.000 | 140.000 | 70.000 |
| Max. Avg. | 35.000 | 42.000 | 170.000 | 178.000 | 175.000 |
| 24# Var. | .004 | .062 | .332 | .093 | .164 |
| 16# Var. | .008 | .028 | .402 | .123 | .557 |
| 20# Var. | .010 | .037 | .257 | .137 | .601 |
| Max. Var. | .100 | .500 | 1.000 | .500 | 2.500 |

Figure 7A:
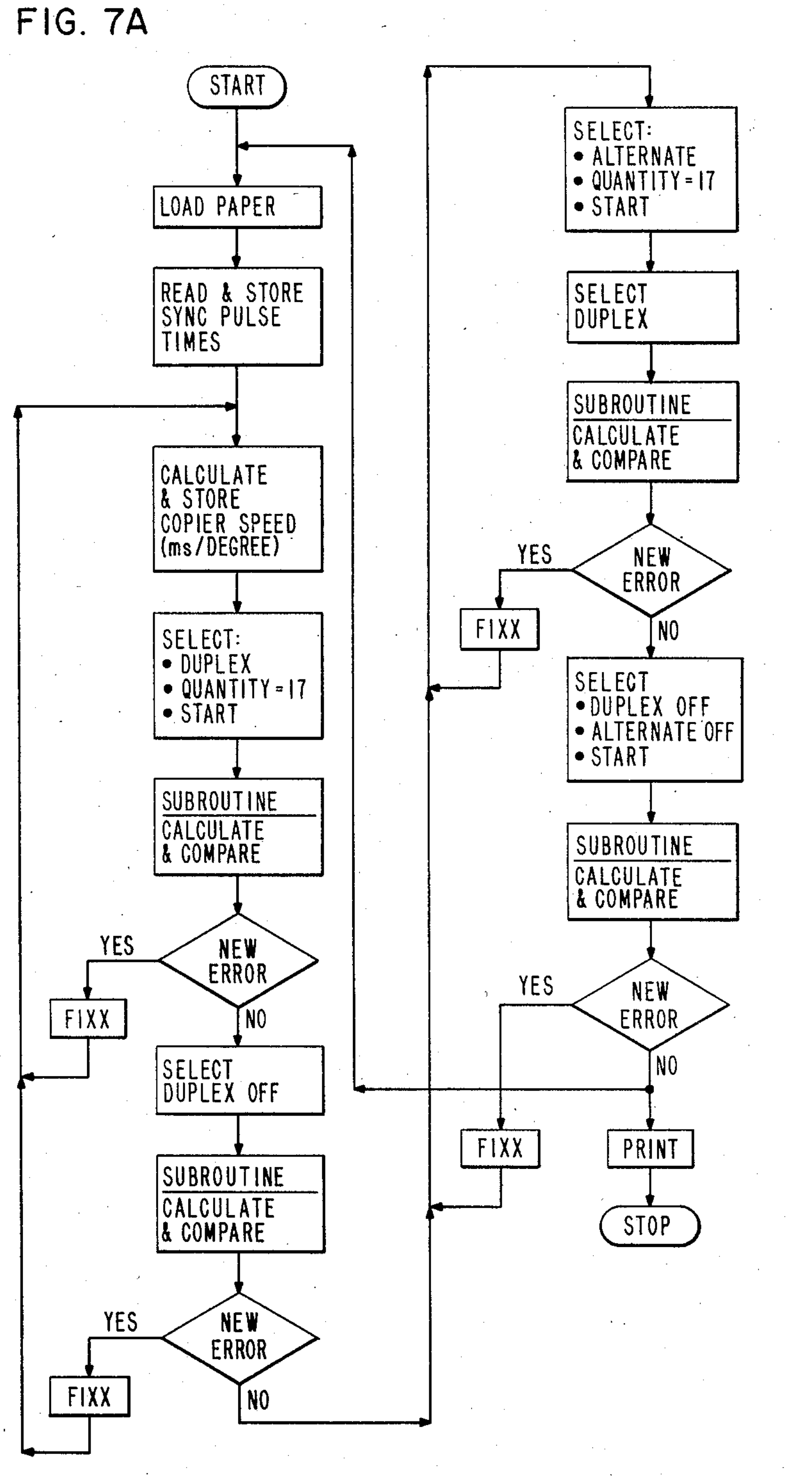
FIGS. 7A and 7B are flow diagrams illustrating operation of the invention.
Figure 7B:
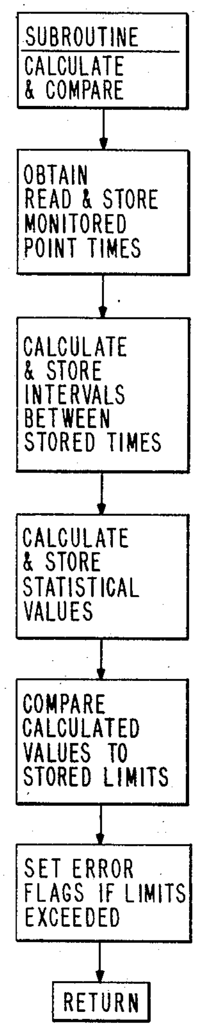

Referring to the flow diagrams of FIGS. 7A and 7B, after an operator loads copy paper into the information distributor 101 and a test original document sheet into the entry tray 102, Sync Switch signals on copier signal line 212 connected to one of the sensors 114 indicate times that sync pin 116 passes that sensor. The times are stored in memory 205. The CPU 204 and arithmetic hardware 206 calculate, and store in internal random access memory 205, the copier's mechanical (photoconductor drum) speed from the known distance between sync pins 116 and the stored times. This speed value must be within predetermined slow and fast speeds for proper copier operation; however, successive values deviating from a predetermined norm may indicate impending problems, even though all values fall within the set limits. The CPU 204 grounds a bit line 217 of input/output bus 202 to place a ground on monitor cable 120 on the Duplex Switch line connected to Duplex Switch 317. The information distributor 101 grounds copier signal point 309 which lights duplex lamp 316 on the control panel display 110. In FIG. 5, quantity selection buttons "1" and "7" are similarly grounded by signals from CPU 204, to select "17" copies of the original document in the entry tray 102. The information distributor 101 operates appropriate ones of the A–G, Recopy, Hundreds, Tens, and Units lines lighting quantity selection display 112A to show the number "17". The CPU 204 then grounds copier signal line 211, grounding the Start copier signal point 311 to start the information distributor as though start switch 501 had been closed.

The flow diagram of FIG. 7B shows that selected points in FIGS. 3-6 are monitored by copier signal lines (such as 209-215 in monitor cables 120-124 to place bits on bit line 217 of input/output bus 202 connected to CPU 204 via digital input/output ports 203. If a signal (for example, a ground) is detected on a copier signal line, the time of occurrence is stored in internal random access memory 205 at a location associated with the device that caused the signal. Eventually an array of the times of operation of each monitored point will be stored. The CPU 204 and arithmetic hardware 206 then calculates the differences between the times stored for selected pairs of the monitored points and stores these, as intervals, in additional locations of internal random access memory 205. Intervals calculated from previous copier 101 operation, usually for different copy paper weights, are also stored in the internal random access memory 205. The corresponding intervals are combined to give calculated statistical results (mean, deviation, etc.) each of which is then compared against predetermined limits also stored in internal random access memory 205. The results of the comparison set error flags if the limits are exceeded—the internal random access memory 205 storing an error word comprising at least one bit for each comparison.

In FIG. 7A, if no calculated interval newly exceeds its corresponding limit, the ground on the Duplex Switch 317 operation is removed, the Duplex Lamp 316 goes off, and the operations described with respect to FIG. 7B is repeated. If this results in the limits nqt being newly exceeded, then, in FIG. 7A, the same operations are repeated, but with the operation simulating (by grounding) closing of both the alternate paper switch and duplex switch 317 in FIG. 3. If the limits are not newly exceeded, then, in FIG. 7A, the operations are repeated with the two switches ungrounded. The error bits are printed for analysis if no values newly exceeded the limits. In FIGS. 7A and 7B, if any values exceeded the limits during comparison, error flags identifying the condition are set. If any error flag is set as a result of a calculation, at least that calculation is repeated. Repetition continues until no error bits, not previously set, are set during a calculation.

The operations described may be repeated after loading additional paper into the copier 101.

Five major programs, SWTIME2, Convert2, Print1, Limit1, and FIXX control an IBM Series/1 system while it tests a copier. The source code program listings use the Event Driven Executive instructions described in the IBM SERIES/1, PROGRAM DESCRIPTION AND OPERATIONS MANUAL, SB30-1213-2 (1978) published by the International Business Machines Corporation. An assembler generates machine code for the Series/1 from the source code, as described in the manual.

The SWTIME2 program instructs an operator to set up the copier for testing and measures the intervals between copier operations. The Convert2 program computes statistical functions of the measured intervals and compares these functions with predefined limits. Exceptional cases are flagged as errors. The Print1 routine prints a report summarizing computation results. The Limit1 program assigns the limits with which statistical functions are compared. An additional FIXX program suggests possible corrections of failures identified by the Convert2 program. The FIXX program looks at error flags in the Convert2 program and based on this will suggest possible fixes for that error. In the Detailed Example below, program SWTIME2 assumes that selected copier points are connected to the computer's input/output ports and that an operator is ready to load the copier with paper and run it through conventional copier operations. If any of these conditions is not true, or if the connected copier is not one for which the program was written, appropriate operator instigated, or program recognized, test termination procedures are performed instead of a test.

The program SWTIME2 run section, lines 2090-2730, is preceded by declarations and followed by subroutines and task routines. The declarations include input and output definitions (lines 470-740) and data definitions (lines 840-1760). The input definitions identify where copier points connect to the computer. For example, the aligner switch "SWALGN" connects to input port 1 "PI1", which refers to the contents of the first bit "BIT=0" in a word starting at address 59 of a control block. The run section begins with operator interactions (lines 2090-2280) essential to setting up the test. Then, if the operator successfully prepares the copier for a test, the SPEED (line 6750), and RUNMACH (line 3640) subroutines are performed. The SPEED subroutine (line 6750) calculates and stores the copier's speed in milliseconds per degree of rotation. The RUNMACH (line 3640) subroutine performs a TAKETIM (line 5050) subroutine and the Convert2-program to measure intervals and compute statistical functions for each copier operation designated for testing by the operator.

The RUNMACH program, at line 3830, for example, calls the TAKETIM subroutine and at line 3870 loads the Convert2 program for testing; for example, a copier set up by the operator to run paper from its primary (but not its alternate) paper drawer. Subroutine TAKETIM (line 5050) sequentially performs subroutines which record times at which copier conditions monitored by the computer's input ports occur. For example, in lines 5220, subroutine TAKETIM attaches subroutine PICK (line 8230) which records the successive times "TIMEPK" at which the pick magnet operates to feed paper.

The RUNMACH program, at line 3870, loads the Convert2 program. Starting at line 1400 of the Convert2 program, selected matrices of times such as "PKMAT", "PRMAT" timed by the TAKETIM subroutine are subtracted to get desired timing intervals stored in "PKMAT". For example, the results are converted to floating point format (measured in milliseconds) and then to degrees of rotation. Averages of successive intervals measured at the same copier points are computed starting at line 1970, and the variance for each is computed starting at line 2160. The computed averages and variances are compared against predefined limits, starting at line 2880, and the results ("greater than" or "less than") set appropriate status words. For example, in lines 3020-3080, paper ready time "PRMAT", average time "AVPRD" sets a status word one way if it is less than the minimum average duplex paper ready limit "AMINDPR" and another way if it is greater than the maximum average paper ready time limit.

The limits are initially set, and modified, by the Limit1 program which permits the controlling programmer to enter and edit the limit values. The status words set in the Convert2 program generate an output report when the Print1 program is run.

DETAILED EXAMPLE

| | | |
|---|---|---|
| | [-1-SWTIME2] | |
| 470 | DEFINE - | SWITCHES SENSED |
| 840 | | DATA VARIABLES |
| 1790 | | ERRORS |
| 2090 | OPERATOR INTERACTION | |
| 2320 | SPEED (6750) | |
| 2390 | RUNMACH (3640) | |
| | 3830 - | TAKETIM (5050) |
| | | 5100 - CPP MONITOR (8820) |
| | | 5220 - PICK (8230) |
| | | 5230 - ALGN (8100) |
| | | 5240 - DET (7950) |
| | | 5250 - FUS (7810) |
| | | 5260 - EXT (7580) |
| | 3870 - | [-2-CONVERT2] |
| | | 200 - DEFINE - DATA |
| | | 1400 - FLOAT/DEGREES |
| | | 1970 - COMPUTE - AVERAGES |
| | | 2160 VARIANCES |
| | | 2860 - COMPARE AVER/VAR TO LIMITS |
| | 2690 - | [-3-PRINT1] |
| | 3960 - | [-4-FIXES] (FIXX) |
| | | [-5-LIMIT1] (Stand Alone) |

While the invention has been particularly shown and described with reference to a preferred embodiment thereof, it will be understood by those skilled in the art that various changes in form and details may be made therein without departing from the spirit and scope of the invention.

What is claimed is:

1. A method for predicting and identifying failure of an electrophotographic copier before a failure occurs, comprising the steps of:

monitoring selected signal-supply points of the copier;

detecting the occurrence of signals at the selected points;

timing detected signals;

assigning to individual detected signals current digital time values representing the time at which the signal occurred;

storing digital values including a plurality of preselected digital limit values representing copier operational limits;

calculating differences between chosen pairs of current digital time values;

storing the differences as digital difference values;

generating digital statistical values, representing averages and variances as a function of the stored digital difference values;

storing the generated digital statistical values;

comparing one by one, digital statistical values representing averages and variances with digital limit values representing copier operational limits corresponding to said values;

storing as digital result values the results of the comparisons; and signaling as a potential failure each stored digital result value representing an average or variance exceeding its corresponding copier operational limit.

2. A method for predicting and identifying failure of a copier before a failure occurs, comprising the steps of:

monitoring points of the copier and detecting the occurrence of signals at the points;

timing detected signals and assigning to individual detected signals values representing the time at which the signal occurred;

storing values including a plurality of preselected limit values representing copier operational limits;

calculating differences between chosen pairs of time values and storing the differences as difference values;

generating statistical values, representing averages and variances as a function of the stored difference values and storing the generated statistical values;

comparing one by one, statistical values representing averages and variances with limit values representing copier operational limits, and storing as result values the results of the comparisons; and signaling as a potential failure each stored result value representing an average or variance exceeding its corresponding copier operational limit.

3. A method for predicting and identifying failure of a copier before failure occurs comprising the steps of:

monitoring signals from the copier;

assigning to signals values representing the times at which the signals occurred;

determining differences between pairs of time values;

generating statistical values, representing averages and variances, as a function of the differences;

comparing one by one, statistical values with limit values representing corresponding copier operational limits; and signaling as a potential failure each value representing an average or variance exceeding its copier operational limit.

* * * * *